United States Patent Office 3,444,784
Patented May 20, 1969

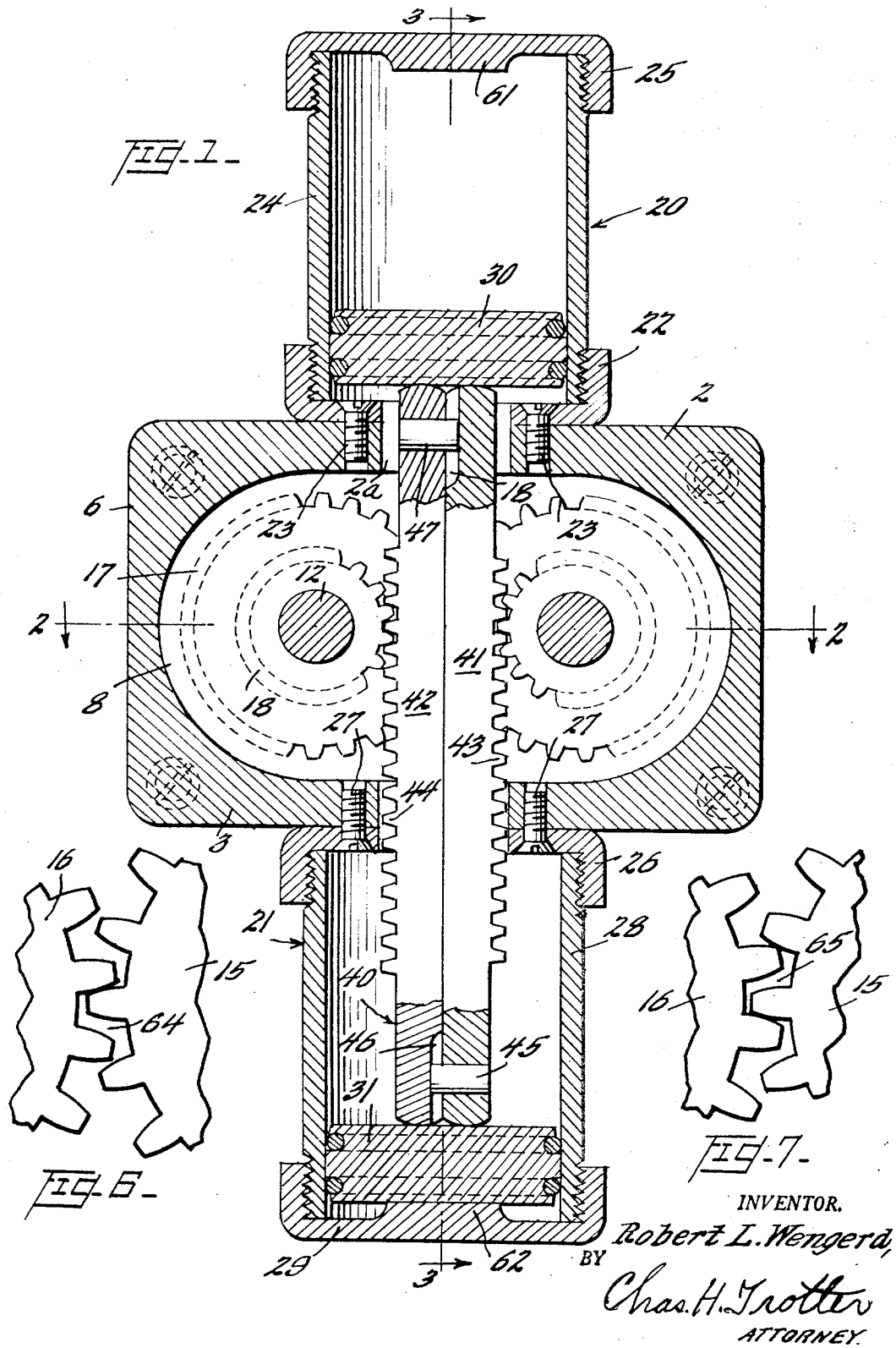

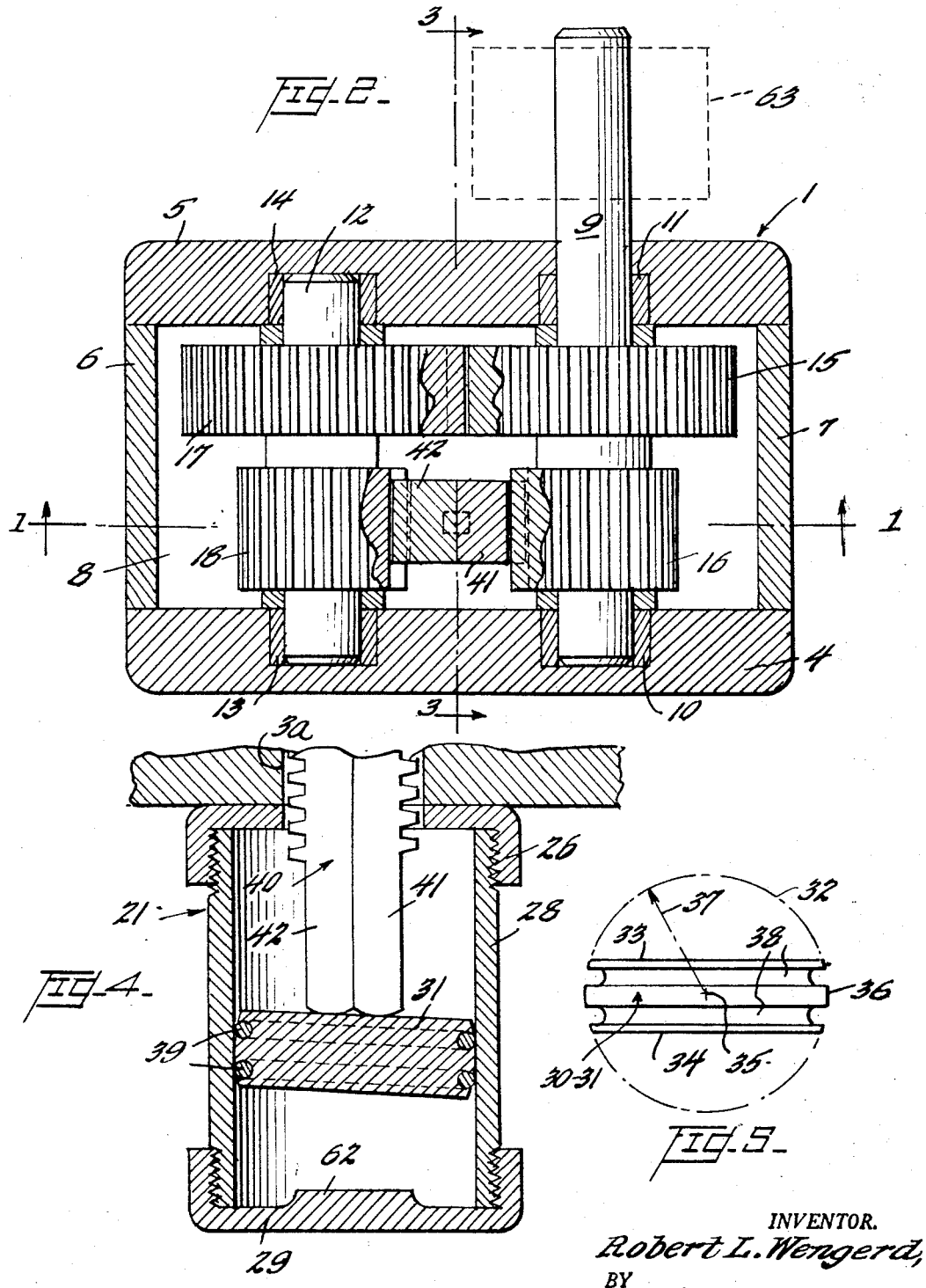

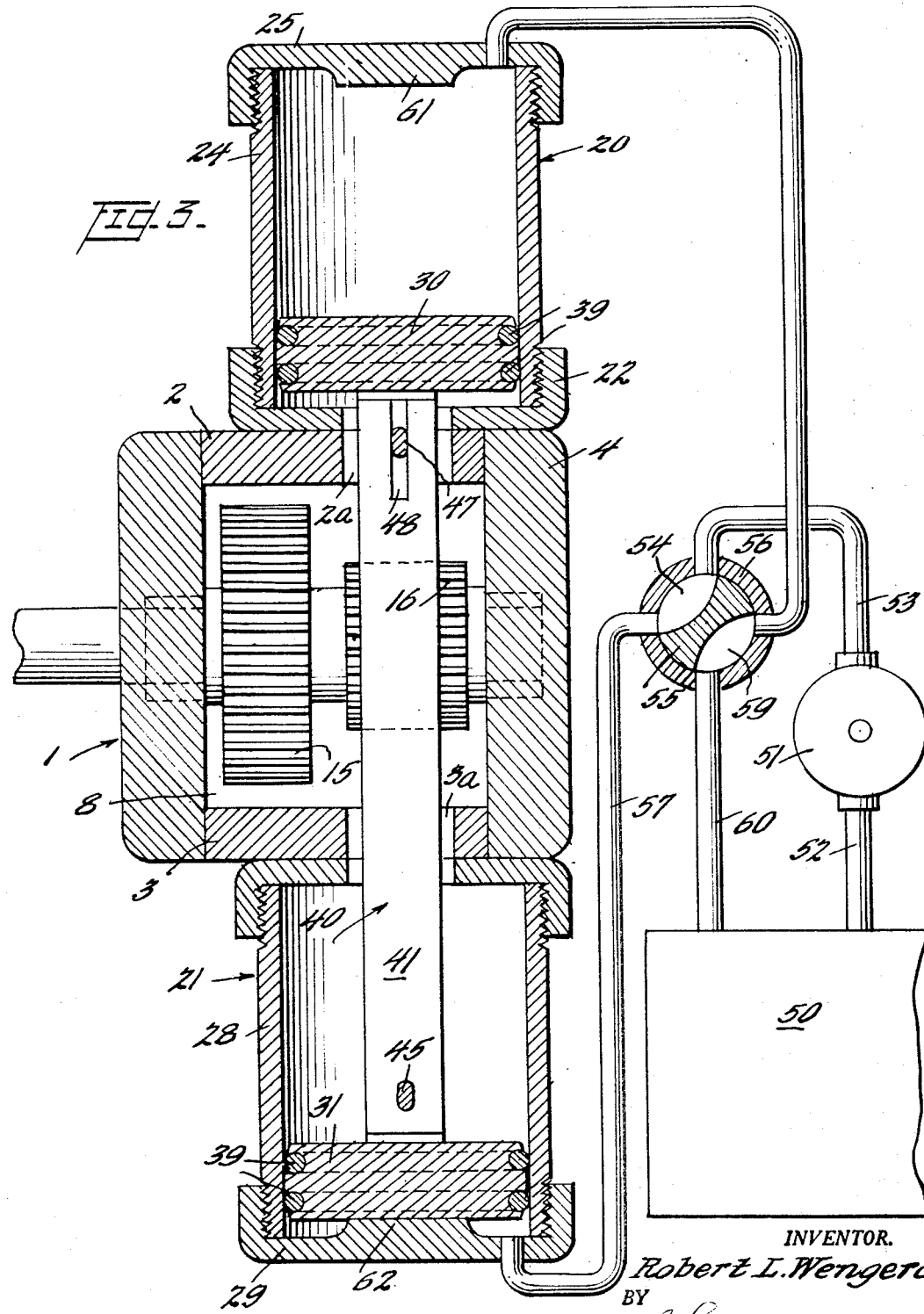

3,444,784
FLUID MOTOR ROTARY ACTUATOR
Robert L. Wengerd, Kidron Road, R.D. 2,
Orrville, Ohio 44667
Filed Dec. 19, 1966, Ser. No. 602,732
Int. Cl. F15b 11/06; F01b 1/02; F16j 1/10
U.S. Cl. 91—413                    6 Claims This invention relates generally to fluid motor rotary actuators by which an input linear motion is converted to an output rotary motion which is proportional to the input linear motion.

The invention is of the general type in which a reciprocal rack mechanism meshes with and actuates a gearing mechanism. The rack mechanism is adapted to be reciprocated predetermined amounts in each direction by fluid pressure which is alternately applied to each end thereof; and the gearing mechanism, which is actuated by the reciprocation of the rack mechanism, is connected to and rotates a power output shaft back and forth in accordance with the direction and amount of movement imparted to the rack mechanism. The rotation of the output shaft is directly proportional to the linear movement of the rack mechanism.

Actuators of this general type are especially adapted for use in, and are extensively used in servo-mechanism incorporated in the control mechanism of aircraft, guided missiles, and high precision machines. When so used actuators of this type must be extremely accurate in operation to insure that a predetermined known power input imparted thereto will produce a known power output which is directly proportional to the power input.

It is therefore one the principal objects of the invention to provide an improved fluid motor rotary actuator of the aforesaid character which is of such sturdy simple construction that all likelihood of failure thereof during operation is reduced to a minimum if not entirely eliminated.

Another object of the invention is to provide an actuator of the aforesaid character employing rack and gearing mechanisms which are so constructed and arranged that the back lash between meshing gears and racks and gears is automatically taken up or eliminated prior to the imparting of any rotary movement in either direction to the power output shaft, thereby assuring a more accurate power output in response to a known power input.

Another object of the invention is to provide an actuator of the aforesaid character in which canting of the rack mechanism is eliminated thereby minimizing wear and assuring longer life.

Still another object of the invention is to provide an actuator of the aforesaid character which is relatively simple and inexpensive to manufacture.

The rotary actuator of the present invention comprises generally a housing having top, bottom, side and end walls, thereby providing a closed chamber therein in which a gearing mechanism is mounted.

The gearing mechanism comprises a power output shaft which is rotatably supported by a suitable bearing, carried by the front and rear side walls with the rear end thereof extending out through the rear side wall. An idler shaft which is disposed parallel to the output shaft, in horizontally spaced relation thereto, is rotatably supported by a similar bearing carried by the front and rear side walls and extends therebetween. A larger spur gear and a smaller spur gear are mounted on and secured to the power output shaft within the housing chamber; and similar larger and smaller gears are mounted on and secured to the idler shaft with the larger gear thereon in mesh with the larger gear on the power output shaft, and with the smaller gear thereon disposed directly opposite the smaller gear on the power output shaft.

An upper fluid pressure cylinder is secured to the top wall of the housing and extends upwardly therefrom, and a similar lower fluid pressure cylinder is secured to the bottom wall of the housing and extends downwardly therefrom in axial alignment with the upper fluid pressure cylinder. The common axis of the upper and lower cylinders, which is prependicular to the plane of the output and idler shafts, is disposed intermediate the axes of the output and idler shafts and between the ends of the smaller gears. A piston having a toric periphery is mounted in the upper cylinder for reciprocal and tilting movement therein, and a similar piston is similarly mounted in the lower cylinder. The free outer ends of the cylinders are closed by removable cylinder heads which are provided with inwardly extending bosses to prevent the pistons from bottoming against the inner faces of the heads at the limit of their outer movement.

The rack mechanism, through which the gearing mechanism is actuated by the reciprocal movement of the pistons in the upper and lower cylinders and which comprises a pair of similar rack bars which are keyed together back to back or a slight longitudinal movement with respect to each other, is disposed between the two smaller gears with one of the rack bars in mesh with one of the smaller gears and the other of the rack bars in mesh with the other of the smaller gears, and with the longitudinal axis thereof coincident with the common axis of the upper and lower cylinders. The upper ends of the rack bars, which are arcuate in form, extend up through an aperture in the top wall of the housing into the upper cylinder below the piston therein or abutting engagement therewith, and the lower ends of the rack bars, which are likewise arcuate in form, extend down through an aperture in the bottom wall of the housing into the lower cylinder above the piston therein or abutting engagement therewith. The length of the rack bars is equal to the distances between the lower face of the piston in the upper cylinder and the upper face of the piston is the lower cylinder when the pistons are simultaneously at the limit of their movement in the same direction.

As the rack mechanism is reciprocated torque is applied directly to the power output shaft from one of the rack bars which is in mesh with the smaller gear on the output shaft, and indirectly to the power output shaft from the other rack bar, the smaller gear on the idler shaft, the idler shaft, the larger gear on the output shaft and the larger gear on the output shaft which is disposed in mesh with the larger gear on the idler shaft. The construction is such that during operation all slack or back lash between the rack bars and the smaller gears and between the meshing larger gears is automatically taken up before any rotary movement in either direction is imparted to the power output shaft.

The opposed inner ends of the upper and lower cylinders and the chamber therebetween are filled with lubricating oil which, during operation, is forced back and forth between the cylinders through the chamber.

Having stated the principal objects of the invention, other and more specific objects thereof will be apparent from the following specification and the accompanying drawings forming a part thereof in which:

FIG. 1 is a vertical sectional view through a fluid motor actuator constructed according to the invention, the plane of the section being indicated by the line 1—1 on FIG. 2;

FIG. 2 is a horizontal sectional view taken on the line 2—2 on FIG. 1;

FIG. 3 is a central vertical sectional view taken on the line 3—3 on FIGS. 1 and 2, and showing the mechanism for supplying fluid under pressure to the actuator cylinders and exhausting it therefrom;

FIG. 4 is a detail section showing the manner in which the pistons cant in their respective cylinders during operation;

FIG. 5 is a side elevation of one of the pistons diagrammatically illustrating the manner in which the pistons are constructed; and FIGS. 6 and 7 are enlarged exaggerated fragmentary detail views illustrating, when considered with FIG. 4, the manner in which the back lash between the meshing gears secured to the power output shaft and idler shaft respectively during the initial movement of the rack means in either direction is taken up or eliminated.

The construction and operation of the actuator having been generally described, it will now be specifically described in connection with the drawings with the use of reference characters in which the numeral 1 indicates generally a housing having the top and bottom walls 2 and 3 respectively, the front and rear side walls 4 and 5 respectively, and the end walls 6 and 7 defining a closed chamber 8.

A power output shaft 9 is rotatably supported within the housing 8 by bearings 10 and 11 carried by the front and rear walls 4 and 5 respectively with one end thereof extending out from the chamber 8 through the rear wall 5; and an idler shaft 12 is rotatably supported within the chamber 8 in horizontally spaced parallel relation with the output shaft 9 by bearings 13 and 14 carried by the front and rear walls 4 and 5 respectively. A larger gear 15 and a smaller gear 16 are mounted on and secured to the power output shaft 9 within the chamber 8 in slightly spaced relation to each other. A larger gear 17, similar to the larger gear 15, is mounted on and secured to the idler shaft 12 in mesh with the larger gear 15 mounted on the power output shaft 9; and a smaller gear 18, similar to the smaller gear 16 mounted on the power output 9, is mounted on and secured to the idler shaft directly opposite the smaller gear 16 on the power output shaft.

An upper fluid pressure cylinder, generally indicated by the numeral 20, is secured to and extends upwardly from the top wall 2 of the housing 1, and a similar lower fluid pressure cylinder, generally indicated by the numeral 21, is secured to the bottom wall 3 of the housing 1 and extends downwardly therefrom in axial alignment with the upper cylinder 20. The common axis of the cylinders 20 and 21 is disposed intermediate the output and idler shafts between the ends of the opposed smaller gears 16 and 18.

The upper cylinder 20 comprises an inner internally threaded cup shaped cylinder head 22 which is removably secured to the top wall 2 of the housing 1 by screws 23, a cylindrical body 24, having externally threaded ends, which is screwed into the head 22, and an outer internally threaded cup shaped cylinder head 25 which is screwed onto the outer end of the cylinder body 24.

The lower cylinder 21 comprises an inner internally threaded cup shaped cylinder head 26 which is removably secured to the bottom wall 3 of the housing 1 by screws 27, a cylindrical body 28, having externally threaded ends which are screwed into the head 26, and an outer internally threaded cylinder head 29 which is screwed onto the outer end of the cylinder body 28.

A piston 30 is reciprocally mounted in the cylinder 20, and a similar piston 31 is reciprocally mounted in the cylinder 21. The pistons 30 and 31 each consist of the central section of a sphere 32 the diameter of which is substantially the same as the inside diameters of the cylinder bodies 24 and 28, as diagrammatically shown in FIG. 5, and each comprises the spaced parallel flat end walls 32 and 34, which are equi-distant from the center 35 of the sphere 32, on opposite sides thereof, and a toric periphery 36, both curvatures of which are equal to the radius 37 of the sphere 32. The construction is such that the pistons 30 and 31 may cant slightly during the reciprocal movement thereof in their respective cylinders 20 and 21, as will be hereinafter explained. The pistons 30 and 31 are provided with spaced parallel annular grooves 38 in which flexible sealing O-rings 39 are mounted.

A vertically disposed rack mechanism, generally indicated by the numeral 40, which is interposed between the smaller gears 16 and 18, in mesh therewith, with the longitudinal vertical axis thereof coincident with the aligned axes of the cylinders 20 and 21, extends upwardly through an aperture 2ª in the top wall 2 of the housing 1 and the cylinder head 22 into the inner end of the cylinder 20 and into contacting engagement with the piston 30 therein, and downwardly through an aperture 3ª in bottom wall 3 of the housing 1 and the cylinder head 26 into the inner end of the cylinder 21 and into contacting engagement with the piston 31 therein. The rack mechanism 40 comprises a pair of similar elongated rectangular rack bars 41 and 42 one of which, 41, is provided with teeth 43 which are disposed in mesh with the smaller gear 16 on the output shaft 9, and the other of which, 42, is provided with teeth 44 which are disposed in mesh with the smaller gear 18 on the idler shaft 12. The rack bars 41 and 42 are slidably keyed together back-to-back, for slight longitudinal movement with respect to each other during operation, by a key 45 which is carried by the rack bar 41 and engages a slot 46 in the rack bar 42, and a key 47 which is carried by the rack bar 42 and engages a slot 48 in the rack bar 41.

The rotor actuator is adapted to have piston actuating fluid, such as oil, selectively imparted under pressure to the outer end of one of the cylinders 20–21 and simultaneously exhausted from the outer end of the other of the cylinders 20–21 for reciprocating the rack mechanism 40 through the pistons 30–31 in the cylinders 20–21 respectively. As shown in FIG. 3 oil is withdrawn from a reservoir 50 by a pump 51 through a conduit 52 and forced under pressure through a conduit 53, passageway 54 in the plug 55 of a three way valve 56, and conduit 57 and into the outer end of the cylinder 21 below the piston 31 therein thereby forcing the piston 31 upwardly in the cylinder 21 and with it the rack mechanism 40. The upward movement of the piston 31 and rack mechanism 40 forces the piston 30, in contact with the upper end of the rack mechanism 40, upwardly in the cylinder 20 thereby forcing the oil in the outer end of the cylinder 20 above the piston 30 out from the cylinder 20 through the conduit 58, passageway 59 in the plug 55, and conduit 60 back into the reservoir 50. By rotating the valve plug 55 clockwise through 90° so that the passageway 54 connects the conduits 53 and 58 and the passageway 59 connects the conduits 57 and 60 oil will be forced into the outer end of the cylinder 20 by the pump 51 through the conduit 53, passageway 54, and conduit 58, and simultaneously exhausted from the outer end of the cylinder 21 back into the reservoir 50 through the conduit 57, passageway 59, and conduit 60. The inner faces of the outer cylinder heads 25 and 29 are provided with inwardly extending bosses 61 and 62 respectively to prevent the pistons 30 and 31 from bottoming against the inner faces of the cylinder heads 25 and 29 thereby impeding the admission of oil into the cylinders 20 and 21. In certain installations of the rotary actuator air under pressure may be used in place of oil.

During reciprocation of the rack mechanism 40 torque will be imparted directly to the power output shaft 9 from the rack bar 41 through the smaller gear 16, and indirectly thereto from the rack bar 42 through the smaller gear 18, idler shaft 12, larger gear 17, and larger gear 15 mounted on the power output shaft 9 in mesh with the larger gear 17. The outer end of the power output shaft 9 is adapted to have power takeoff means, such as a gear, cam, or lever arm, connected thereto as indicated by the dotted lines 63 in FIG. 2.

The construction of the rack mechanism 40 is such that during the initial upward movement of the rack mechanism by the piston 31 in the cylinder 21 the rack bars 41 and 42 will be moved upwardly in unison until the back lash between the rack bars 41 and 42 and the small gears 16 and 18 respectively is taken up, at which time there will be a momentary pause in the upward movement of the rack bar 41 while the piston 31 cants and thereby moves the rack bar 42 slightly further upwardly with respect to the rack bar 41, as shown in FIG. 4, and rotates the larger gear 16 from the position shown in FIG. 6 to the position shown in FIG. 7, thereby taking up the back lash 64 between the larger gears 15 and 17, after which the rack bars 41 and 42 are moved on upwardly in unison by the canted piston 31. During the initial downward movement of the rack mechanism by the piston 30 in the cylinder 20 there will be a momentary pause in the downward movement of the rack bar 41 when the back lash between the rack bars 41 and 42 and the smaller gears 16 and 18 has been taken up until the piston 30 cants and moves the rack bar 42 slightly further downwardly with respect to the rack bar 41 and rotates the larger gear 17 from the position shown in FIG. 7 to the position shown in FIG. 6, thereby taking up the reverse back lash 65 between the larger gears 15 and 17, after which the rack bars 41 and 42 are moved on downwardly in unison. The rack bars 41 and 42 are provided with arcuate upper and lower ends, as indicated at 65, to facilitate the canting of the pistons 30 and 31 and the movement of the rack bars 41 and 42 in unison by the canted pistons.

The chamber 8 and the opposed inner ends of the cylinders 20 and 21 are filled with lubricating oil, which is not shown for clarity of illustration. On the upward movement of the pistons 30 and 31 in the cylinders 20 and 21 oil is forced out of the cylinder 21 through the aperture 3ª into the chamber 8, and from the chamber 8 through the aperture 2ª into the cylinder 20; and on the downward movement of the pistons 30 and 31 in the cylinders 20 and 21 oil is forced out of the cylinder 20 through the aperture 2ª into the chamber 8, and from the chamber 8 through the aperture 3ª into the cylinder 21.

From the foregoing it will be apparent to those skilled in this art that I have provided a very simple and efficient mechanism for accomplishing the objects of the invention.

It is to be understood that I am not limited to the specific construction shown and described herein as various modifications may be made therein within the spirit of the invention and the scope of the appended claims.

I claim:
1. A fluid motor actuator of the character described comprising; a housing having top, bottom, side and end walls defining a closed chamber; a power output shaft rotatably mounted in said chamber with one end thereof extending out through one of said side walls, an idler shaft rotatably mounted in said chamber in spaced parallel relation to said power output shaft; a first larger gear and a first smaller gear secured on said power output shaft within said chamber, a second larger gear which is secured on said idler shaft in mesh with said first larger gear, a second smaller gear which is secured on said idler shaft in opposed relation to the said first smaller gear; an upper fluid pressure cylinder secured to the top wall of said housing and extending upwardly therefrom, and a similar lower fluid pressure cylinder secured to the bottom wall of said housing and extending downwardly therefrom in axial alignment with said upper cylinder, a piston slidably mounted in said upper cylinder, and a similar piston slidably mounted in said lower cylinder; an elongated rack means interposed between said first and second smaller gears in mesh with each of said gears with the upper end thereof extending upwardly through an aperture in the top wall of said housing into said upper cylinder and the lower end thereof extending downwardly through an aperture in the bottom wall of said housing into said lower cylinder; and means by which fluid under pressure is adapted to be selectively supplied to the outer end of one of said cylinders and simultaneously exhausted from the outer end of the other of said cylinders, whereby said rack means is adapted to be reciprocated thereby applying torque directly to said power output shaft through said first smaller gear and indirectly thereto through said second smaller gear, said idler shaft, said second larger gear and said first larger gear.

2. A fluid motor actuator as defined by claim 1 in which said chamber and the opposed inner ends of said cylinders are filled with lubricating oil which is adapted to be forced out of the inner end of one of said cylinders into said chamber and out of said chamber into the inner end of the other of said cylinders during the reciprocal movement of said pistons in said cylinders.

3. A fluid motor actuator as defined by claim 1 in which said rack means comprises a pair of similar rack bars disposed back to back with one of said racks disposed in mesh with the said first smaller gear secured on said power output shaft and the other of said racks in mesh with the second smaller gear secured on said idler shaft.

4. A fluid motor actuator as defined by claim 1 in which said rack means comprises a pair of similar individual racks which are keyed together back-to-back for slight longitudinal sliding movement thereof with respect to each other.

5. A fluid motor actuator as defined by claim 4 in which said pistons are each provided with a toric periphery whereby they may assume a canted position in said cylinders during the reciprocation thereof.

6. A fluid motor actuator as defined by claim 5 in which said similar racks are each provided with arcuate upper and lower ends.

References Cited
UNITED STATES PATENTS

| | | | |
|---|---|---|---|
| 1,271,569 | 7/1918 | Hancock | 92—136 |
| 2,254,935 | 9/1941 | Darling | 92—129 |
| 2,737,157 | 3/1956 | Hefner et al. | 92—129 |

CARROLL B. DORITY, JR., *Primary Examiner.*

U.S. Cl. X.R.
92—61, 129, 140